Patented Dec. 4, 1923.

1,476,649

UNITED STATES PATENT OFFICE.

HERBERT C. SCHAD, OF LOS ANGELES, CALIFORNIA.

PEANUT BUTTER AND PROCESS OF MAKING SAME.

No Drawing.   Application filed November 24, 1922.   Serial No. 603,098.

*To all whom it may concern:*

Be it known that I, HERBERT C. SCHAD, a citizen of United States, residing at Los Angeles, in the county of Los Angeles and State of California, have invented new and useful Improvements in Peanut Butter and Processes of Making Same, of which the following is a specification.

The present invention relates to novel improvement in the manufacture of peanut butter, whereby peanut butter of a superior quality is produced, which is free from certain of the objections against ordinary peanut butter.

Heretofore peanut butter has ordinarily been made by roasting peanuts, blanching the same, and cleaning the peanuts, and then grinding into a paste or butter. The peanut butter thereby produced is open to the objection that it possesses certain undesirable adhesiveness, whereby it sticks to the roof of the mouth causing a disagreeable sensation, and also the peanut butter is rather difficult for many people to swallow.

Heretofore in the manufacture of other products, particularly salted peanuts, the nuts, after blanching, were boiled or cooked in oil, peanut oil, olive oil, and some others being commonly used for this purpose. According to the present invention I cook the blanched peanuts in an oil, preferably cocoanut oil, or cocoanut butter, although other oils can be used such as, peanut oil, olive oil, cotton seed oil, or mixtures of these. The cooked peanuts are taken out of the hot oil, and allowed to drain, after which they are ready to be ground in the same manner that the roasted and blanched peanuts have heretofore been ground. The peanut butter produced, does not have the adhesiveness above referred to, and can be more easily swallowed than the peanut butter made by the old processes.

The raw peanuts contain a considerable amount of water. When the peanuts are roasted in an ordinary peanut roaster, a portion of this water is driven off. However, it would not be feasible to heat the peanuts in the roasting operation, for a sufficiently long time to completely drive off the water. Such long continued heating at high temperature would destroy the peanuts for food purposes by imparting a burnt taste to such a degree as to ruin the flavor. In accordance with the present invention, when the blanched peanuts are boiled in the oils as above referred to, tests have shown that a considerably larger proportion of the water in the raw peanuts is removed, than would be the case in the roasting of peanuts, although the peanuts are not heated sufficiently to injure the flavor by producing a somewhat burnt taste. In ordinary practice I boil the peanuts in oil at about the same temperature and for about the same length of time as is commonly used in the making of salted peanuts. This has been found in practice, to remove all or substantially all of the water present in the peanuts, whereby the adhesiveness of the ground peanuts substantially disappears. The removal of the water content of the peanuts by boiling in oil is regarded by me as being the primary cause of the improvement in the quality of the peanut butter. It should of course be understood that after draining off the hot oil, the peanuts are not exposed for a long period of time to moist air before grinding, since the peanuts might absorb and take up sufficient moisture to again produce the adhesiveness in the peanut butter.

As is usual in the art, a small addition of oil can be made to the peanut butter, if desired, in order to produce a better consistency. The amount of oil to be so added will of course depend largely on the percentage of oil in the original peanuts, which varies more or less, as is well known.

What I claim is:

1. Peanut butter free from burnt taste and substantially free from the adhesiveness possessed by ordinary peanut butter, and substantially free from the water content of ordinary peanut butter.

2. A process of making peanut butter which comprises shelling and blanching peanuts, then boiling in oil and then grinding.

3. A process of making peanut butter which comprises boiling shelled and blanched peanuts in a fatty oil, draining the boiled peanuts and grinding the same before they have absorbed any considerable amount of moisture from the atmosphere.

4. A process of making peanut butter, which comprises boiling blanched peanuts in cocoanut oil, draining off the oil from the cooked peanuts, and promptly grinding the same.

In testimony whereof I affix my signature.

HERBERT C. SCHAD.